United States Patent [19]

Macpherson

[11] Patent Number: 4,759,133
[45] Date of Patent: Jul. 26, 1988

[54] METHOD AND APPARATUS FOR AUTOMOTIVE WHEEL ALIGNMENT

[76] Inventor: Roger Macpherson, 185 Pleasant Way 1, Penfield, N.Y. 14526

[21] Appl. No.: 38,473

[22] Filed: Apr. 13, 1987

Related U.S. Application Data

[63] Continuation of Ser. No. 874,423, Jun. 16, 1986, abandoned.

[51] Int. Cl.⁴ ............................................. G01B 5/255
[52] U.S. Cl. ........................................ 33/288; 33/299; 33/228; 33/203.18; 33/DIG. 1
[58] Field of Search ........................ 33/288, 286–287, 33/203.18, 203.19, 203, 245, 250, 227, 228, DIG. 1, 292, 299

[56] References Cited

U.S. PATENT DOCUMENTS

| | | | |
|---|---|---|---|
| 688,497 | 12/1901 | Weimar | 33/292 |
| 1,891,573 | 12/1932 | Phelps | 33/293 |
| 2,249,226 | 7/1941 | Peters | 33/288 |
| 2,292,969 | 8/1942 | Peters | 33/288 |
| 2,532,593 | 12/1950 | Bender et al. | 33/203.2 |
| 2,689,403 | 9/1954 | Wilkerson | 33/203.18 X |
| 2,834,111 | 5/1958 | Sweany | 33/286 |
| 2,972,189 | 2/1961 | Holub | 33/288 |
| 3,091,862 | 6/1963 | MacMillan | 33/288 |
| 3,487,550 | 1/1970 | Herman et al. | 33/228 |
| 4,303,338 | 12/1981 | Morrison et al. | 33/288 X |

FOREIGN PATENT DOCUMENTS 551283 11/1956 Italy ........................... 33/288

*Primary Examiner*—Harry N. Haroian
*Attorney, Agent, or Firm*—Shlesinger Fitzsimmons Shlesinger

[57] ABSTRACT

Method and apparatus for automotive wheel alignment in which a telescope is mounted with its axis precisely parallel with the end plane defined by the automotive wheel hub. A calibrated target is placed and centered directly in front of the telescope on its optical axis. This procedure is repeated for the wheel on the other side of the vehicle. The vehicle is then moved a distance, for example 50 feet, from the targets which are left in place. The telescope is again placed on the wheel hubs and the targets sighted. If both targets remain on the optical axis the wheels are in perfect alignment. If they are not, the calibrations on the target indicate the direction and extent of misalignment. The telescope or instrument is in precise coplanar relationship with the wheel hub by means of the telescope holder which is a body providing a base plane for contact with the end plane defined by the hub, and a V-block at its other end for holding the telescope, the apex of the V-block being parallel with the base plane of the holder.

11 Claims, 3 Drawing Sheets

METHOD AND APPARATUS FOR AUTOMOTIVE WHEEL ALIGNMENT

This application is a continuation of my now-abandoned U.S. patent application Ser. No. 874,423, which was filed June 16, 1986, the benefit of which filing date applicant claims for this application under the provisions of 35 USC 120.

BACKGROUND OF THE INVENTION

This invention relates to a method and apparatus for automotive wheel alignment. More particularly, the invention relates to toe alignment of automotive wheels.

Of the several wheel alignment factors (caster, camber, toe-in and toe-out) the toe alignment is by far the most critical. Probably 95% of all excessive front tire wear is caused by toe misalignments, either toe-in or toe-out. Excessive toe-in causes tires to wear on the outside; toe-out causes tires to wear on the inside. All vehicles have toe adjustments.

Camber, the amount by which the wheel is off vertical when the vehicle is level, is not a measurable tire wear factor. Camber of the front wheels changes continually while the vehicle is in motion. Some vehicles do not even have a chamber adjustment.

Caster, the tilting of the front steering axis backward or forward is the least important of all front end settings. Vehicles with Macpherson struts do not have caster adjustments.

In all automotive vehicles as manufactured, the steering wheel is centered with a rack and pinion, or a pitman arm. Centering allows the steering mechanism to give equal turns to the right and left, and allows the front wheels to go out of parallel the proper amount on turns. If an unknowledgeable mechanic has removed the steering wheel to center the steering, a good alignment job is impossible until the wheel is put in the factory position.

In vehicles with a pitman arm, the pitman and idler arms should be straight ahead or parallel to the frame of the car when the steering wheel is centered. In vehicles with rack and pinion steering, there should be exactly the same amount of turn from the steering wheel center position to the right and left lock positions.

Any looseness in the front wheel bearings, idler arm, or tie rod joints will make it impossible to obtain repeat readings on any alignment system. As vehicle mileage accumulates, the front wheel bearings get loose first, then the idler arm and rarely the tie rod ends. The greatest culprit in front end mechanism wear is out-of-balance front tires, which make the car vibrate and pound all joints and bearings much more than road bumps. One under-inflated front tire will make the vehicle pull in that direction. The more the under-inflation, the greater the pull. This is the most common cause of pulling complaints.

The accuracy of the alignment system of this invention allows the user to check for looseness when reading the alignment of the vehicle. As one of the front wheels is turned $\frac{1}{8}$ degree and returned, the other should follow and return. If it doesn't, the looseness should be corrected before the car is aligned.

The alignment system of this invention gives accurate readings on the rear wheels of cars with independent rear suspension.

U.S. Pat. No. 2,249,226 issued July 15, 1941 to Peters is the most relevant prior art that I know of. The Peters patent discloses a light beam projector for mounting to the wheel of a vehicle and for directing a light beam to a calibrated target close to the vehicle. This device is variously used for toe, camber, and caster adjustment. The system and its use are quite different from the present invention.

SUMMARY OF THE INVENTION

The present invention is a simplified method and device, usable on all sizes and types of automotive vehicles, for checking wheel toe alignment. A telescope is magnetically mounted on each of the front wheel hubs, the axis of each scope being precisely parallel to the plane defined by the hub on which it is mounted. A calibrated target is placed directly in front of each telescope and centered on the axis of the telescope. The vehicle is then moved back from the targets a known distance, e.g. 50 feet. The telescopes again sight the targets, and if alignment is perfect each telescope will sight the center of its target. To the extent that one telescope is not on the center of the target when the other one is, the extent and direction of misalignment is indicated by the calibrations on the target. The telescope holder is a body providing a base plane for contact with the end plane of the wheel hub and a V-block for holding the telescope, the apex of the V-block being parallel with the base plane.

DRAWING

DESCRIPTION

Figure 1:
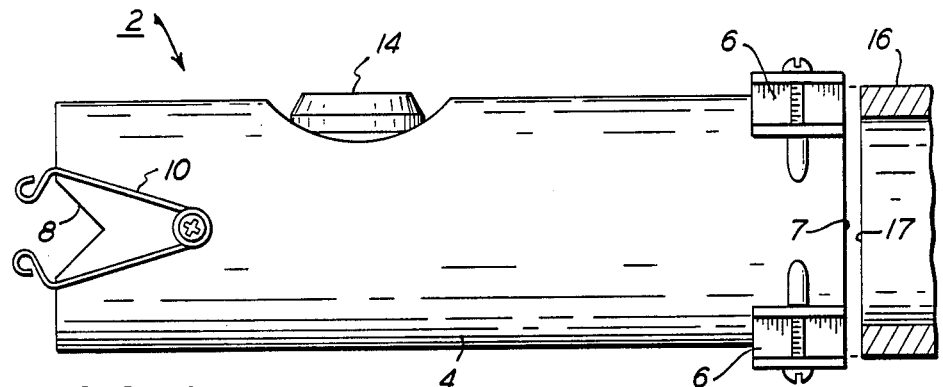
FIG. 1 is an elevation view of a telescope holder which is a part of this invention.
Figure 2:
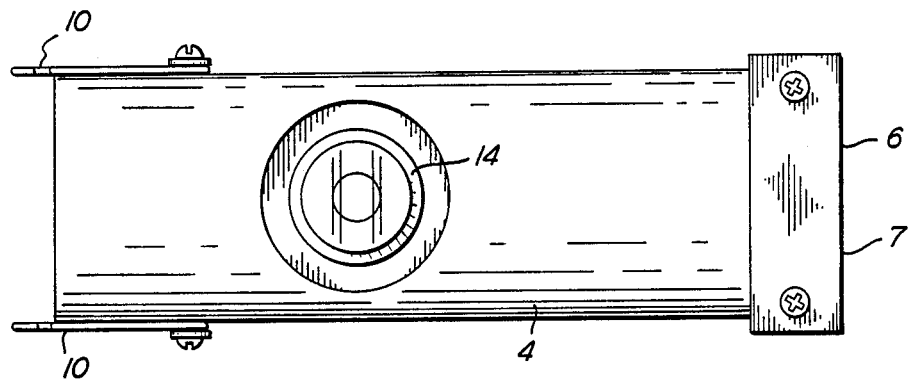
FIG. 2 is a top plan view of the arrangement in FIG. 1.
Figure 3:
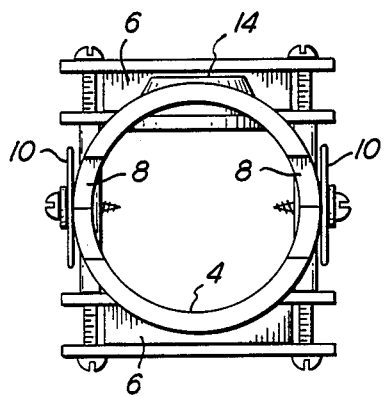
FIG. 3 is an axial view of the same, as from the left end of FIG. 1.
Figure 4:
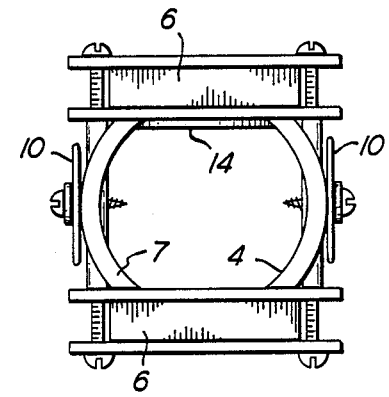
FIG. 4 is an axial view of the same, as from the right end of FIG. 1.
Figure 5:
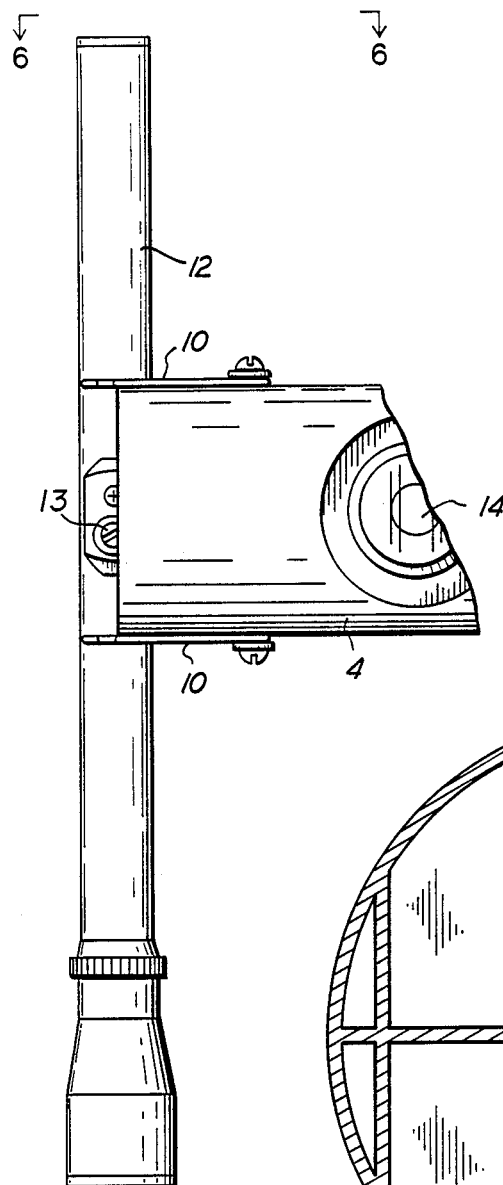
FIG. 5 is a plan view, similar to FIG. 2 and partially broken away, including a telescope mounted in the holder.
Figure 6:
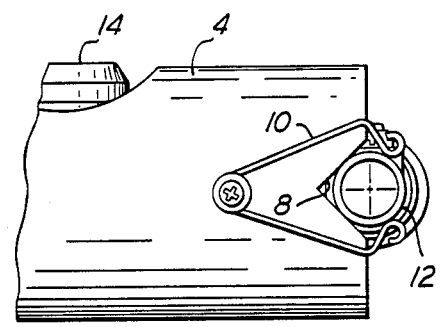
FIG. 6 is an end view as indicated by the line 6—6 in FIG. 5.

Referring to FIGS. 1-6, a telescope holder is shown generally at 2 and includes a body 4 with a magnet or magnets 6 rigidly fixed to its right end. The end surfaces of the magnets 6 define a base plane 7. The body 4 is a cylindrical tubular member, though it could also be a solid or of a rectangular or other configuration. In the left end of body 4 is a pair of notches 8. The body 4 and the notches 8 together constitute a V-block, the apex of which is parallel with the base plane defined by the magnets. Spring clips 10 are mounted to the end of the body by which to conveniently and removably mount a cylindrical telescope 12 and to hold the telescope seated in the V-block. Telescope 12 is a conventional rifle-type scope having cross hairs adjustable relative to the scope housing in known manner by a pair of adjusting screws 13, only one of which is shown in FIG. 5, and which scope is rotatable on its axis while seated in the V-block. A bubble level gage 14 is mounted on the top of body 4 as an aid in finding the approximate level condition of the V-block and telescope when mounting the device to a vehicle hub.

The telescope holder 2 is magnetically attached to the left front wheel hub 16 of a vehicle, the wheel hub itself defining an end plane 17 to face the base plane 7 of the telescope holder. Magnets 6 and hub 16 are shown slightly separated in FIG. 1 for clarity of illustration. In reality, they are in contact and the base plane 7 and end plane 17 are one. A second telescope holder 2 is similarly mounted to the right front wheel hub, as represented in FIG. 4.

Figure 7:
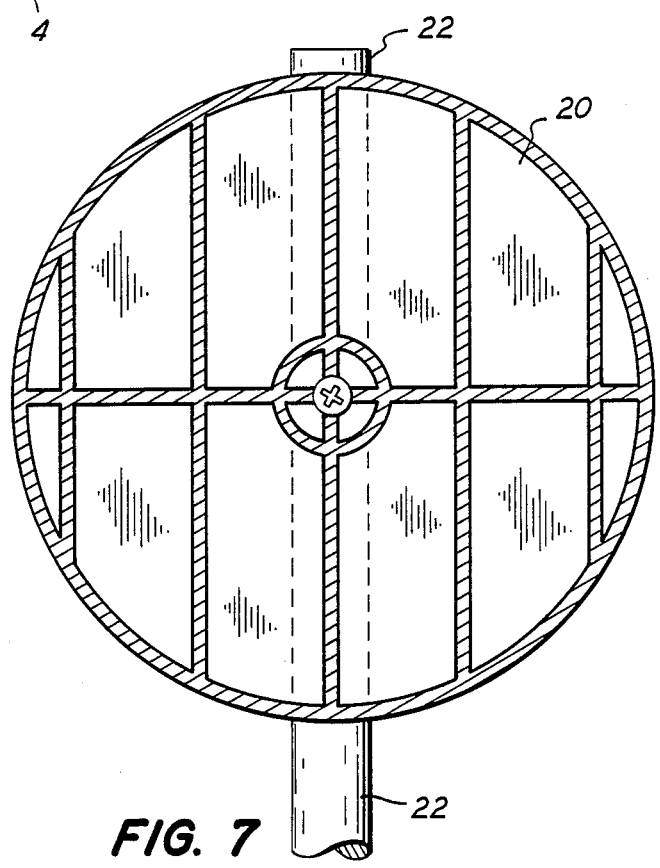
FIG. 7 shows a target for use with each alignment device.
Figure 8:
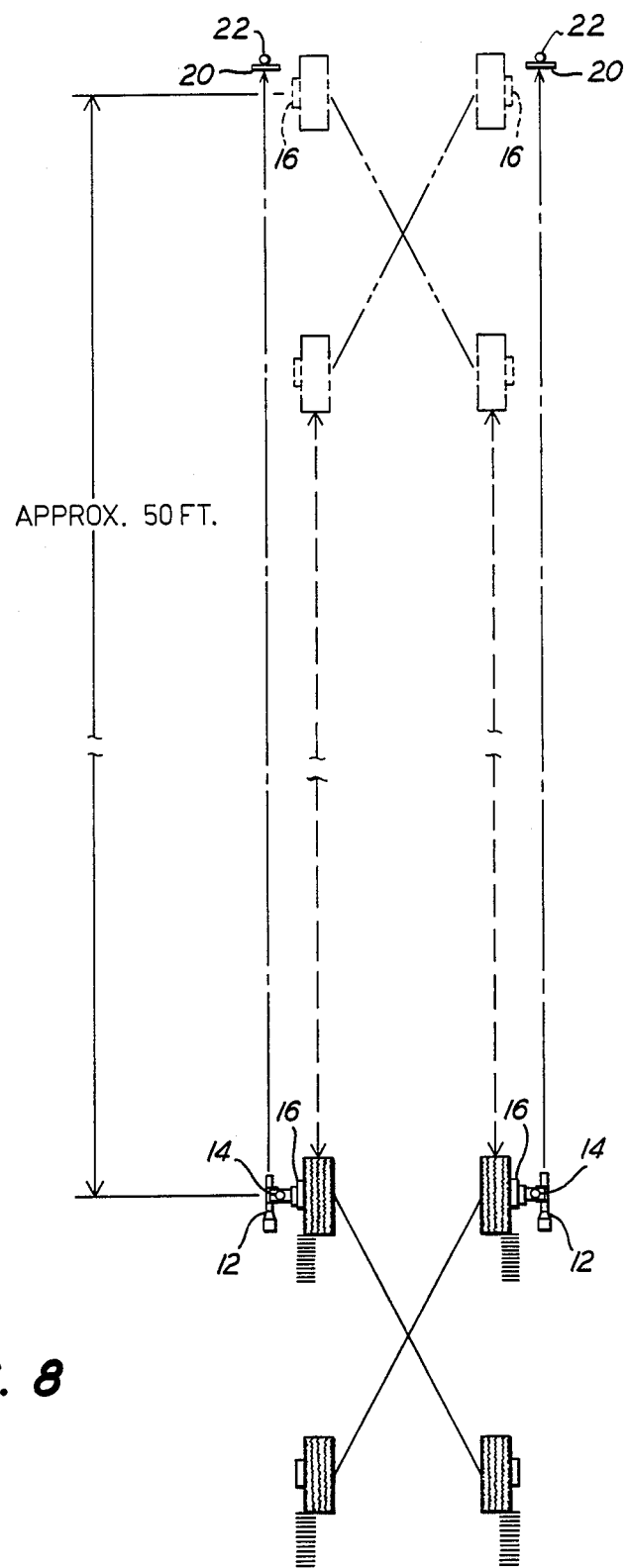
FIG. 8 is a plan view of the four wheels of a vehicle showing the geometry of the method of this invention.

FIG. 7 shows the face of a target 20 which is vertically slidable on a post 22 (FIG. 8). The vertical lines on the target represent increments of ⅛ degree at 50 feet. The post 22 is mounted on a simple stand and is simply placed on the ground and is movable as desired.

OPERATION

Before this alignment instrument is used, it must be calibrated to achieve accurate repeat readings. When the optical axis of a telescope is true with the barrel of the telescope, the intersection of its cross hairs will remain on a point as the telescope is rotated 360 degrees in a V block. Setting the optical axis of each telescope, by means of the adjustment screws 13, which in the case of telescope 12 are located in the center of the telescope under protective caps, is accomplished as follows:

a. Place a telescope holder 2 on a flat surface (glass, formica, or machined steel) and mount a telescope in the spring clip and V block.

b. Sight an object at least 50 feet away with the cross hairs vertical and horizontal.

c. Adjust the top screw 13 as shown in FIG. 5 (tightening the adjustment screw raises the cross hairs) so that the horizontal cross hair is at the same vertical height on the object when the scope is rotated 180 degrees.

d. Now rotate the telescope 90 degrees and, if necessary, adjust the other screw 13 to adjust the second cross hair in the same way.

e. Recheck the first setting and see that the cross hairs remain on a point for complete 360 degree rotation.

f. Check parallelism of the magnetic holder by turning the telescope end-for-end in the holder and rotating the holder 180 degrees on the flat solid surface.

g. Any dirt, foreign material or chips adhering to the magnetic base will give erroneous readings. When the alignment instrument is calibrated properly it will measure one minute (1/60th of a degree) or 3/16th of an inch on the target at 50 feet.

Referring now to FIG. 8, the following are the steps taken to use the alignment instrument for reading toe alignment and camber:

1. Remove hub caps and grease caps from the front wheels. Clean and deburr the face of each front wheel hub where the magnetic holders will mount.

2. Select a spot where the front and rear bumpers are level and which provides 50 feet of clear space.

3. Place the vehicle at the front end of this space (represented in phantom) with the steering wheel in the straight-ahead position.

4. Attach a magnetic telescope holder 2, with the telescope 12 in the V block, to each hub 16 with the level bubbles 14 centered.

5. Set up a target 20 in front of each telescope 12 so that the nose of the telescope is centered on the center circle of the target. (The targets slide up and down on the posts.)

6. Remove the magnetic holders and telescopes. Do not disturb the targets. Back the vehicle to a second position (solid lines) approximately 50 feet from the targets.

7. Without instruments, simply sight the outsides of the rear and front tires on each side and move the vehicle if necessary so that the target posts 22 appear equidistant from each side of the vehicle.

8. Re-attach the magnetic holders and telescopes with the level bubbles centered.

9. Read camber from the levels 14 on each side.

10. Sight each telescope and rotate the holders 2 to set horizontal lines on target centers.

11. Set both cross hairs of the left telescope on the center of the target by turning the steering wheel.

12. Read toe alignment from the right side. The two vertical lines on the targets on each side of center indicate ⅛ and ¼ degree of toe-in and toe-out.

13. Manufacturer's specifications for your vehicle will indicate adjustments required.

The following are the steps taken to set toe alignment with the steering wheel centered:

1–6. Follow steps 1 through 6 as given above.

7. Because 95% of vehicles dog-track it is necessary to put the vehicle in the dog-track or down-the-road position before setting toe and centering the steering wheel. Put the holders 2 and telescopes 12 on the rear wheels. Move the front end of the vehicle slightly to right or left if necessary by inching forward with the steering wheel turned until both telescopes hit the targets equidistant from the center vertical lines. This places the rear axle square and parallel with the targets.

8. With the rear axle thus square and parallel to the targets, the vehicle is now in the true straight-down-the-road position.

9. Re-attach the magnetic holders 2 with the telescopes 12 to the front wheel hubs.

10. Sight each telescope and rotate the holders 2 to set the horizontal lines on the target centers.

11. Center the steering wheel and adjust the tie-rod turn-buckles to bring each telescope to the proper toe setting angle on the target. Manufacturer's specifications for your vehicle will indicate toe settings and adjustments required.

12. The steering wheel may move when you adjust the turn-buckles, so re-check before final adjustment and tightening.

13. Vehicles with independent rear suspension should be adjusted for rear wheel toe before adjusting the front end. When checking for rear end toe, set the targets 20 at the rear wheels before backing to the second position, and position the car so that the targets appear equidistant from each side.

The various manufacturers of automobiles have their own unique dimensions, including the distance between the front wheels. The alignment system of this invention makes use of the vehicle itself for set-up of the targets. This establishes the exact dimension of hub-to-hub width (plus the lengths of the telescope holders). The targets are thus precisely set, and then the vehicle is moved rearward 50 feet for readings. This system indicates ⅛ degree (7½ minutes) as 1.3122 inches on the target at 50 feet. The operator can easily distinguish angular increments of 1 minute, which is roughly 3/16 inch on the target. This precision far exceeds that called for by the manufactures.

This system allows the operator to check the calibration of the equipment while it is mounted on the vehicle for use. Simply rotating the telescope verifies that its optical axis is true with the barrel. The parallelism of the magnetic base with the V-block is ascertained simply by rotating the holder 180 degrees and turning the telescope end-for-end in the V-block.

The typical prior art alignment equipment in current use is liable to go out of calibration. It is part of the uniqueness and the benefit of this invention that it can be calibrated while in use.

In addition, this calibration is simple in concept and performance and can be readily understood by any lay person who uses this system. There is no mystery to it.

What is claimed is:

1. Portable wheel alignment apparatus for checking the alignment of the wheels of an automotive vehicle including:
    a body having one end defining a base plane and adapted for removable and adjustable engagement with the end plane defined by one of the wheel hubs of an automotive vehicle, and the other end including a V-block of which the apex is parallel to said base plane,
    a telescope disposed to be removably mounted in said V-block, and to be calibrated while in said V-block to direct a line of sight parallel to the apex of said V-block,
    a target having on its face spaced graduations for measuring toe-in, and calibrated to be read by said telescope when the target is spaced a predetermined distance from said vehicle,
    means for supporting said target on the ground at a point spaced from said vehicle, and in confronting relation to said telescope,
    said target being vertically adjustable on said supporting means relative to said ground and said vehicle, and
    means resiliently supporting said telescope in said V-block for rotation manually relative to said V-block during calibration of said telescope,
    said means resiliently supporting said telescope in said V-block comprising a resilient spring clip mounted on said body and engaging said telescope releasably to hold said telescope resiliently in seating engagement on said V-block.

2. Portable wheel alignment apparatus as defined in claim 1, further including a magnet on said one end of said body for magnetic attachment to the wheel hub of an automotive vehicle, the end surface of said magnet upon attachment to said hub being coplanar with said base plane.

3. Portable wheel alignment apparatus as defined in claim 1, wherein the optical axis of said telescope is positioned parallel to said V-block and said base plane.

4. Portable wheel alignment apparatus as defined in claim 1, wherein said body is rotatable on said wheel hub to verify that said base plane is parallel with the apex of said V-block.

5. Portable wheel alignment apparatus as defined in claim 1, including
    a second body similar to the first-named body, and disposed to be mounted on another of the wheel hubs of said vehicle,
    a second telescope disposed releasably to be mounted in the V-block in said second body, and
    a second target similar to the first-named target, and supported on the ground in spaced relation to said vehicle and said first-named target, and in spaced, confronting relation to said second telescope.

6. Portable wheel alignment apparatus as defined in claim 5, further including a level gauge on each said body to indicate the level condition of said apex and said optical axis of the body thereby to facilitate directing the same at a distant target.

7. A method of vehicle wheel alignment, including the steps of:
    a. mounting the housing of a telescope on each of the left and right front hubs of a vehicle, with the optical axis of each telescope parallel with the end plane defined by each hub, and centering a pair of cross hairs in each telescope on a target positioned before each of said telescopes,
    b. with the targets remaining in place, moving the vehicle rearward by a predetermined distance and again mounting said housings of said telescopes to said hubs to view said targets with the cross hairs of one of said telescopes directed again at its target center,
    c. viewing the other of said targets through the other of said telescopes to determine the direction and extent of any misalignment of said left and right front hubs as represented by the offset of the cross hairs of said other of said telescopes from the center of said other target.

8. A method of reading vehicle wheel alignment as defined in claim 1, in which at least one of said targets is calibrated to correlate a lateral displacement on the target with angular misalignment at a given dimension of said predetermined distance.

9. A method of vehicle wheel alignment as defined in claim 2 in which said predetermined distance is 50 feet.

10. A method as defined in claim 1 including calibrating each of said telescopes for accurate readings at said predetermined distance, comprising
    sighting the cross hairs of a respective telescope on an object positioned at least said predetermined distance from the telescope, and adjusting the cross hairs of the telescope relative to its housing until the horizontal cross hair is at the same vertical height on said object when the telescope housing is rotated 180° about its axis, and thereafter rotating the last-named housing 90° and performing the preceding step to adjust the second cross hair in the same way, if necessary, and
    repeating the two preceding steps until the cross hairs remain on a point on said object as said last-named housing is rotated 360° about its axis.

11. The method as defined in claim 4 wherein said calibration of each telescope is performed while the housing thereof is mounted on one of said front hubs of said vehicle.

* * * * *